United States Patent
Namiranian

(10) Patent No.: US 10,708,763 B2
(45) Date of Patent: Jul. 7, 2020

(54) ON-BOARDING ENTITY FOR REMOTE EMBEDDED UNIVERSAL INTEGRATED CIRCUIT CARD MANAGEMENT

(71) Applicant: T-Mobile USA, Inc., Bellevue, WA (US)

(72) Inventor: Babak Namiranian, Bothell, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

(21) Appl. No.: 15/828,049

(22) Filed: Nov. 30, 2017

(65) Prior Publication Data

US 2019/0166485 A1 May 30, 2019

(51) Int. Cl.
| | | |
|---|---|---|
| H04M 3/00 | (2006.01) | |
| H04W 8/22 | (2009.01) | |
| H04L 29/06 | (2006.01) | |
| H04W 28/08 | (2009.01) | |
| H04W 36/14 | (2009.01) | |
| H04W 12/06 | (2009.01) | |
| H04W 4/50 | (2018.01) | |
| H04W 12/00 | (2009.01) | |
| H04W 4/70 | (2018.01) | |

(52) U.S. Cl.
CPC .............. *H04W 8/22* (2013.01); *H04L 63/02* (2013.01); *H04L 63/0823* (2013.01); *H04W 4/50* (2018.02); *H04W 12/0023* (2019.01); *H04W 12/00401* (2019.01); *H04W 12/06* (2013.01); *H04W 28/08* (2013.01); *H04W 36/14* (2013.01); *H04W 4/70* (2018.02)

(58) Field of Classification Search
CPC combination set(s) only.
See application file for complete search history.

(56) References Cited

U.S. PATENT DOCUMENTS

| | | | | |
|---|---|---|---|---|
| 2015/0121066 | A1* | 4/2015 | Nix | H04W 4/70 713/155 |
| 2016/0021529 | A1 | 1/2016 | Park et al. | |
| 2016/0037435 | A1* | 2/2016 | Yu | H04W 48/06 370/230 |
| 2016/0165433 | A1 | 6/2016 | Larignon et al. | |
| 2016/0286380 | A1 | 9/2016 | Long | |
| 2016/0373920 | A1* | 12/2016 | Petersson | H04W 12/04 |

(Continued)

OTHER PUBLICATIONS

International Application No. PCT/US2018/062488, International Search Report and Written Opinion, dated Mar. 15, 2019, 11 pages.

Primary Examiner — Justin Y Lee
(74) Attorney, Agent, or Firm — Han Santos, PLLC

(57) ABSTRACT

An on-boarding management entity may be implemented to manage interconnectivity among various enterprise entities and various subscription managers. A subscription manager identifier associated with each of the subscription managers may be used to map different enterprise entities to specific or range of subscription managers. In the event of additions or replacements of subscription managers, a business logic may be employed via a rules engine in order to internally map a subscription manager identifier of the desired subscription manager to the respective subscription manager. The business logic can also be employed to map and relay callbacks and notifications received from the subscription managers to respective enterprise entities.

20 Claims, 6 Drawing Sheets

(56) References Cited

U.S. PATENT DOCUMENTS

| | | | |
|---|---|---|---|
| 2017/0311152 A1 | 10/2017 | Sinning et al. | |
| 2017/0332243 A1* | 11/2017 | Macmullan | H04W 16/14 |
| 2018/0343601 A1* | 11/2018 | Livanos | H04L 47/122 |
| 2018/0367522 A1* | 12/2018 | Nix | H04W 12/06 |
| 2018/0367570 A1* | 12/2018 | Verma | H04L 63/20 |
| 2019/0101880 A1* | 4/2019 | Guim Bernat | G05B 19/045 |

* cited by examiner

ON-BOARDING ENTITY FOR REMOTE EMBEDDED UNIVERSAL INTEGRATED CIRCUIT CARD MANAGEMENT

BACKGROUND

Remote management of embedded UICC (eUICC) or embedded SIM (eSIM) being distinguished from detachable UICC or SIM allows a mobile network operator (MNO) to respond to requests to change subscription from one MNO to another MNO without having physical access to the eUICC in a user equipment or terminal. Generally, eUICC handles multiple profiles from multiple MNOs, wherein only one profile can be enabled at any time in operation. In this regard, mechanisms for over-the-air remote provisioning and management of eUICC in machine-to-machine devices entail downloading new profiles, updating subscription addresses, and enabling, disabling, or deleting profiles as defined in the GMSA Remote Provisioning Architecture for eUICC Technical Specification.

In the case of multiple MNOs, one of the typical configurations entails a single logical subscription manager that hosts multiple MNO's profiles. An enterprise entity (e.g., a partner, a HUB, an aggregator, a client, etc.) may connect to the subscription manager and handle the profiles in accordance with appropriate business logics. In order to diversify, the MNOs may connect with multiple subscription managers and vice versa, wherein some MNOs may not directly connect with subscription managers. Additionally, addition or replacement of subscription managers can change the allocation of subscription managers for different enterprise entities. With multiple enterprise entities and subscription managers, a fully meshed connectivity is not practical and very difficult to manage.

BRIEF DESCRIPTION OF THE DRAWINGS

The detailed description is described with reference to the accompanying figures, in which the left-most digit(s) of a reference number identifies the figure in which the reference number first appears. The use of the same reference numbers in different figures indicates similar or identical items.

DETAILED DESCRIPTION

This disclosure is directed to an on-boarding management entity ("on-board manager") that can comprise an application programming interface (API) that is configured to interconnect with a plurality of enterprise entities and subscription managers supporting at least one network provider in order to map different enterprise entities to one or more specific subscription managers. The enterprise entities maintain, without limitation, eUICC identifier (EID), integrated circuit card identifier (ICCID), and subscription manager secure routing identifier (SMSR-ID) as mandatory attributes. Upon introduction of a newly added subscription manager or a replacement subscription manager, the on-board manager is configured to internally map an identifier (e.g., EID, ICCID, SMSR-ID) from a requesting enterprise entity to a target subscription manager identifier of the desired subscription manager and then select the desired subscription manager. In some embodiments, the enterprise entities can modify the maintained SMSR-ID as needed.

In various embodiments, the on-board manager is configured to manage additions, deletions, or replacements of subscription managers as well as enterprise entities using business logics that is implemented by a rules engine. For example, the on-board manager, via the business logic can automatically route different enterprise entities to specific subscription managers using predefined parameters. In this way, the on-board manager simplifies the complexities of managing multiple subscription managers and enterprise entities by reducing or eliminating changes needed on the part of the enterprise entities and/or subscription managers. In this regard, the on-board manager allows the enterprise entities and subscription managers to remain largely agnostic as the changes are handled by changes in business logics and configurations within the on-board manager.

In some embodiments, the on-boarding manager also provides a framework for additional functionalities such as customized reporting, analytics, inventory management, and access control. Additionally, the on-boarding manager can act as a portal for various enterprise entities for on-boarding and management. Further, the on-boarding manager can be operatively connected to local profile assistance, remote profile management, public key infrastructure components, depending upon embodiments. The techniques described herein may be implemented in a number of ways. Example implementations are provided below with reference to the following figures.

Example Network Architecture

Figure 1:
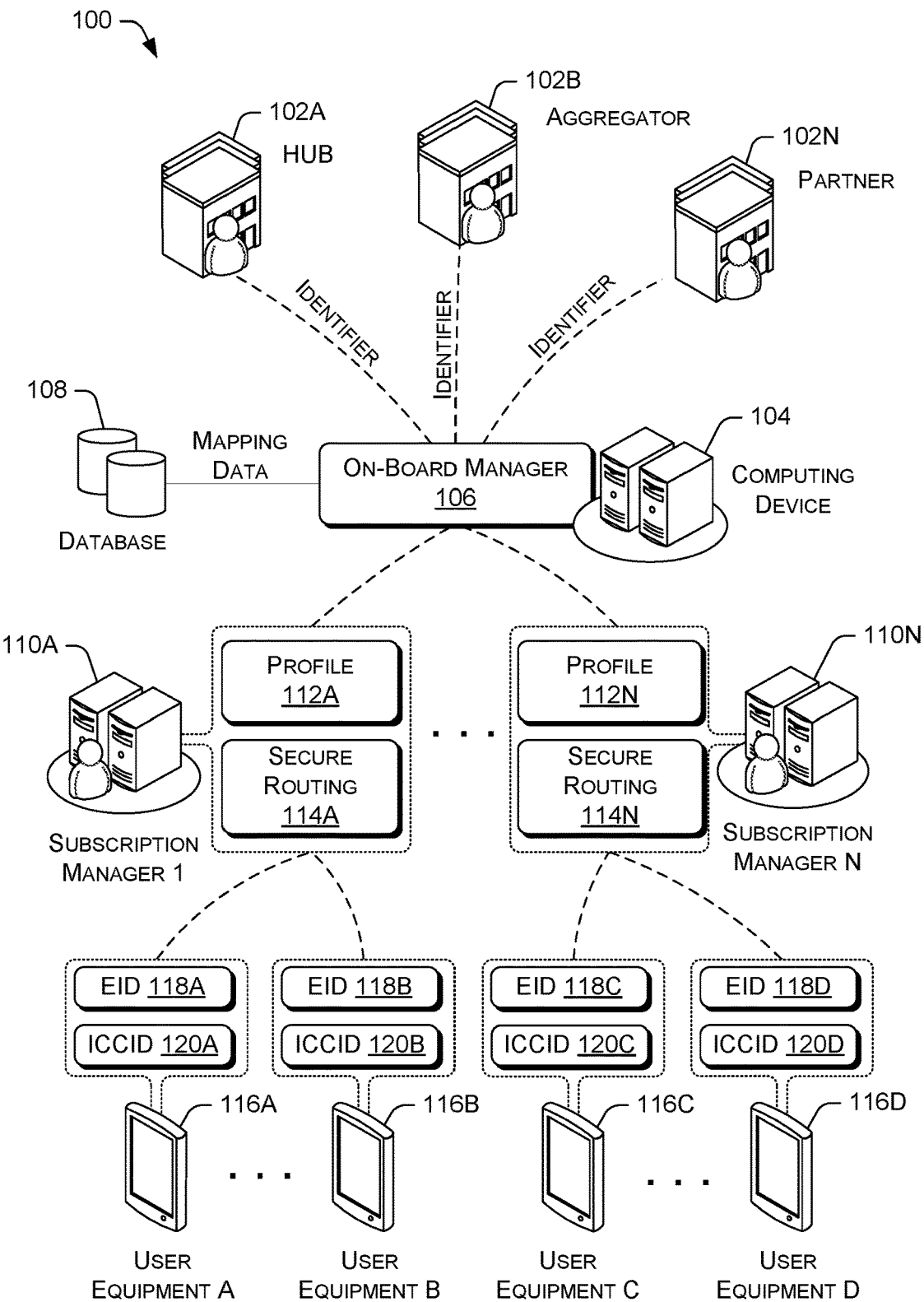
FIG. 1 illustrates an example network architecture for implementing the on-boarding management entity.

FIG. 1 illustrates an example architecture 100 for managing interconnectivities among multiple enterprise entities and multiple subscription managers. The architecture 100 may include an on-board manager 106, wherein the on-board manager 106 can comprise an API, depending upon embodiments. In some embodiments, the on-board manager 106 can reside in a secure data center of an MNO. The on-board manager 106 may execute on one or more computing devices 104. The computing devices 104 may include general purpose computers, such as desktop computers, tablet computers, laptop computers, servers, or other electronic devices that are capable of receive inputs, process the inputs, and generate output data. In various the embodiments, the computing devices 104 may be operated by a wireless communication carrier or a third-party entity that is working with the wireless communication carrier.

The on-board manager 106 is connected to a plurality of enterprise entities, wherein the enterprise entities can comprise a HUB 102A, an aggregator 102B, a partner 102N, a client, and/or so forth. The enterprise entities 102A-102N own, without limitation, EID, ICCID, and SMSR-ID (may be collectively refer to as "identifiers") as mandatory attributes.

The on-board manager 106 is further connected to a plurality of subscription managers (SMs) 110A, 110N. The subscription managers comprise can comprise a device such as a server that is managed by a service provide who manages its subscribers. The subscription managers can generate and manage a profile on an eUICC. Thus, each of the subscription managers 110A, 110N, comprises one or more profiles 112A, 112N and a subscription manager secure routing (SM-SR) 114A, 114N, in which the subscription manager securely performs a function to directly manage profiles on an eUICC. In some embodiments, the profiles 112A, 112N can comprise a provisioning profile, an operational profile, and/or a user profile. The provisioning profile includes information for needed to establish a connection to an MNO. The operational profile includes MNO network access information for receiving service therefrom. If there is no provisioning profile, the operational profile can act as the provisioning file, depending upon embodiments. The user profile includes user information, including a short message service (SMS), multimedia messaging service (MMS), and a phone book. The user profile may be included in an operational profile, depending upon embodiments.

Additionally, each profile can include information related to the subscription manager 110A, 110N and information for establishing a connection or for allowing communication with the subscription manager 110A, 110N, and an authentication credential and key information for performing an authentication (e.g., key exchanges). In some embodiments, the authentication credential comprises an Authentication and Key Agreement (AKA) scheme, public key infrastructure (PKI), and/or other authentication protocol.

Additionally, the profiles 112A, 112N enable the subscription managers 110A, 110N to communicate with respective user equipment 116A-116N or terminals that comprise eUICC having matching profiles, wherein the eUICC is identified by its EID 118A-118D and UCCID 120A-120D. More specifically, a user equipment 116A-116N can access a subscription manager 110A, 110N by using a profile 112A, 112N selected from one of the profiles 112A, 112N stored in the subscription manager 110A, 110N. In this way, the user equipment can communicate with an MNO using the subscription manager. The eUICC automatically performs a user authentication with respect to a mobile communication network, to which a user has subscribed, by using the information stored in the eUICC, so that the user may conveniently receive mobile communication services through the user equipment 116A-116N.

The user equipment 116A-116N may include smart phones, game consoles, personal digital assistants (PDAs) or other electronic devices having a wireless communication function that are capable of receive inputs, process the inputs, and generate output data. However, in other embodiments, the user equipment 116A-116D comprises general purpose computers, such as desktop computers, tablet computers, laptop computers, servers, and so forth. Additionally, the user equipment or terminal may include a machine to machine (M2M) terminal. In various the embodiments, the user equipment 116A-116D may be operated by a wireless communication carrier or a third-party entity that is working with the wireless communication carrier.

In some embodiments, the on-board manager 106 may implement business logic using a rules engine to route an enterprise entity 102A-102N to the desired subscription manager 110A, 110N using, for example, a mapping module. In one scenario, the on-board manager 106 receives SMSR-ID from an enterprise entity 102A-102N and selects a subscription manager 110A, 110N based on the SMSR-ID, wherein the SMSR-ID identifies SM-SR 114A, 114N stored in the subscription manager. Similar mapping scheme can be applied to properly route a subscription to the desired enterprise entity.

Additionally, in scenarios where a subscription manager is added, replaced, removed, or disabled, the rules engine, via the business logic can map one SMSR-ID to another SMSR-ID destined for the new, replacement, or desired subscription manager. For example, when at least one subscription manager is connected to the on-board manager 106, the rules engine determines the least busy subscription manager based on a business logic and enables the on-board manager 106 to receive SMSR-ID for at least one subscription manager and map the received SMSR-ID to one of the subscription manager that is the least busy. In another example, when a subscription manager is removed and replaced with a new subscription manger, the rules engine identifies the replacement subscription manager (i.e., the new subscription manager) based on a business logic and enables the on-board manager 106 to receive SMSR-ID for at least one subscription manager and map the received SMSR-ID to the replacement subscription manager.

In some embodiments, the on-board manager 106 is operatively connected to a database 108. The database 108 may store mapping data that is generated from routing an enterprise entity to a subscription manager and vice versa. In this regard, the mapping data comprises a mapping of different enterprise entities and subscription managers. The data base 108 may also store information relating to subscription managers 110A, 110N, enterprise entities 102A-102N, and/or so forth.

Example Computing Device Components

Figure 2:
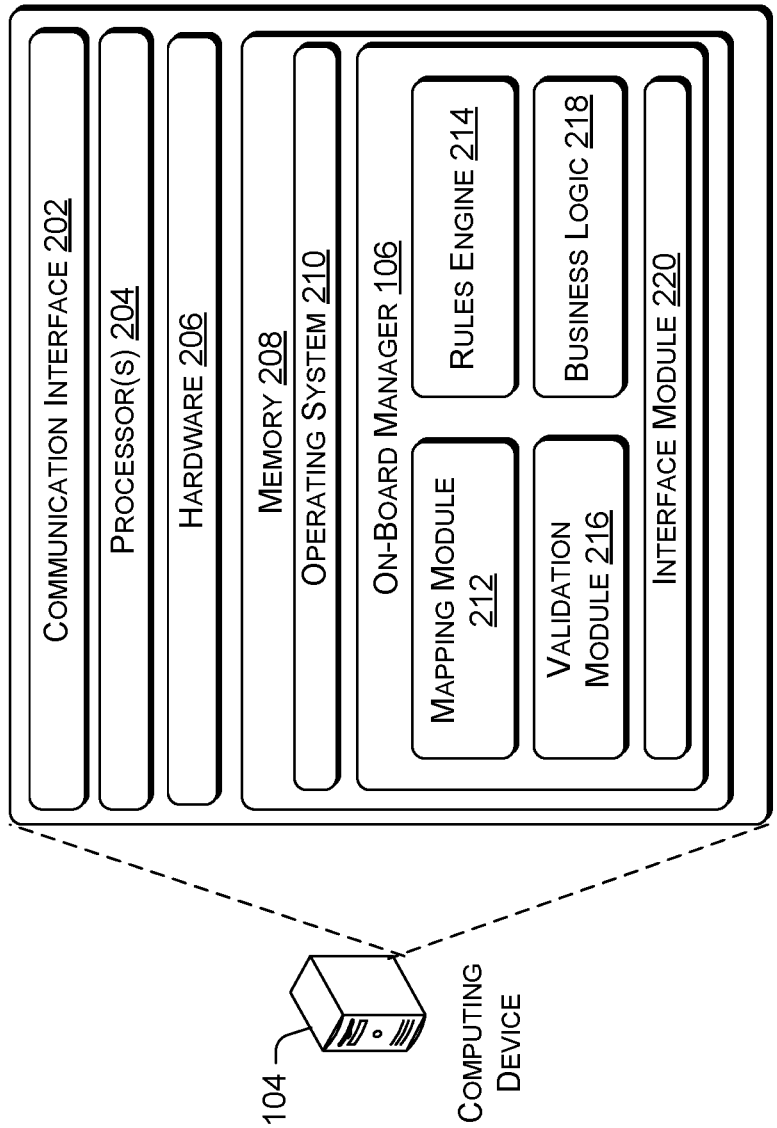
FIG. 2 is a block diagram showing various components of an illustrative computing device that implements the on-board management entity.

FIG. 2 is a block diagram showing various components of an illustrative computing device 104 that implements the on-board manager. The computing device 104 may include a communication interface 202, one or more processors 204, hardware 206, and memory 208. The communication interface 202 may include wireless and/or wired communication components that enable the computing device 104 to transmit data to and receive data from other networked devices. The hardware 206 may include additional user interface, data communication, or data storage hardware. For example, the user interfaces may include a data output device (e.g., visual display, audio speakers), and one or more data input devices. The data input devices may include but are not limited to, combinations of one or more of keypads, keyboards, mouse devices, touch screens that accept gestures, microphones, voice or speech recognition devices, and any other suitable devices.

The memory 208 may be implemented using computer-readable media, such as computer storage media. Computer-readable media includes, at least, two types of computer-readable media, namely computer storage media and communications media. Computer storage media includes volatile and non-volatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD), high-definition multi-media/data storage disks, or other optical storage, magnetic cassettes, magnetic tape, magnetic disk storage or other magnetic storage devices, or any other non-transmission medium that can be used to store information for access by a computing device. In contrast, communication media may embody computer-readable instructions, data structures, program modules, or other data in a modulated data signal, such as a carrier wave, or other transmission mechanism.

The processors 204 and the memory 208 of the computing device 104 may implement an operating system 210 and the on-board manager 106. The operating system 210 may include components that enable the computing device 104 to receive and transmit data via various interfaces (e.g., user controls, communication interface, and/or memory input/output devices), as well as process data using the processors 204 to generate output. The operating system 210 may include a presentation component that presents the output (e.g., display the data on an electronic display, store the data in memory, transmit the data to another electronic device, etc.). Additionally, the operating system 210 may include other components that perform various additional functions generally associated with an operating system.

The on-board manager 106 includes a mapping module 212, a rules engine 214, a validation module 216, a business logic 218, and an interface module 220. The modules may include routines, program instructions, objects, and/or data structures that perform particular tasks or implement particular abstract data types. The mapping module 212 is configured to map one or more enterprise entities to specific or range of subscription managers using an identifier (e.g., ICCID, EID, SMSR-ID) and vice versa. In one example, the mapping module 212 is configured to receive ICCID from an enterprise entity to identify a profile and match the profile with one that is managed by a subscription manager. Alternatively, if a profile type is given, the mapping module 212 is configured to match the profile with a profile that is managed by a subscription manager. Once the profile is matched, the desired subscription manager is identified and the mapping module 212 can select the desired subscription manager to allow the enterprise entity and the desired subscription manager to communicate. In another example, the mapping module 212 receives SMSR-ID from an enterprise identity to select the desired subscription manager based on the SMSR-ID, thereby allowing the enterprise entity and the desired subscription manager to communicate.

The mapping module 212 can communicate with the rules engine 214, which implements business logic 218 to route and select specific enterprise entities with specific subscription managers in various scenarios. Without limitation, the scenarios include additions, deletions, disablements, or replacements of subscription managers and/or enterprise entities. For example, the business logic 218 is configured to internally map the received SMSR-ID from an enterprise entity to automatically target SM-SR of the desired subscription manager and route the enterprise entity to the desired subscription manager. Without limitation, the business logic can be based on network partition, round robin, subscription managers' availability/accessibility, predefined parameters.

For instance, the rules engine 214 can receive data inputs to determine the least busy subscription manager and route an enterprise entity to the least busy subscription manager when the enterprise entity is connected to at least one subscription manager. In this way, when the mapping module 212 receives SMSR-ID for a first subscription manager, the rules engine 214, in accordance with the business logic 218, maps the received SMSR-ID to a second subscription manager if the second subscription manager is less busy than the first subscription manager. In another example, the rules engine 214, based on the business logic 218, can make an initial determination as to the particular sequence in which a subscription manager may be selected from a plurality of subscription managers. The determination may be made based on data inputs received from a network engineer, depending upon embodiments.

Once the mapping module 212 maps an enterprise entity to and/or from a subscription manager, the validation module 216 can verify that the identifier received from the enterprise entity matches the subscription manager and vice versa. Additionally, the validation module 216 can verify that correct subscription manager and/or enterprise entity was selected based on the business logic 218. Further, the validation module 216 can receive authentication parameters for remote provisioning from the subscription manager and receive security credentials therefrom upon verification of authentication parameters. In some embodiments, the validation module 216 is configured to perform key exchanges and/or generate a secure digital identifier based on the security credentials.

The interface module 220 may enable the on-board manager 106 to communicate with one or more components of the present system and to receive inputs and route outputs to various applications. For example, the interface module 220 may enable a user (e.g., a network engineer, an administrator, an administrative entity, etc.) to manually select a specific subscription manager or ranges of subscription managers. The interface module 220 may also display information relating to one or more enterprise entities and subscription managers via a user interface display. For example, the interface module 220 can display mapping information, profile information, identifiers, and/or so forth.

Example Processes

FIGS. 3-6 present illustrative processes 300-500 for providing machine-learning based geolocation and hotspot identifier. Each of the processes 300-500 is illustrated as a collection of blocks in a logical flow chart, which represents a sequence of operations that can be implemented in hardware, software, or a combination thereof. In the context of software, the blocks represent computer-executable instructions that, when executed by one or more processors, perform the recited operations. Generally, computer-executable instructions may include routines, programs, objects, components, data structures, and the like that perform particular functions or implement particular abstract data types. The order in which the operations are described is not intended to be construed as a limitation, and any number of the described blocks can be combined in any order and/or in parallel to implement the process. For discussion purposes, the processes 300-500 are described with reference to the architecture 100 of FIG. 1.

Figure 3:
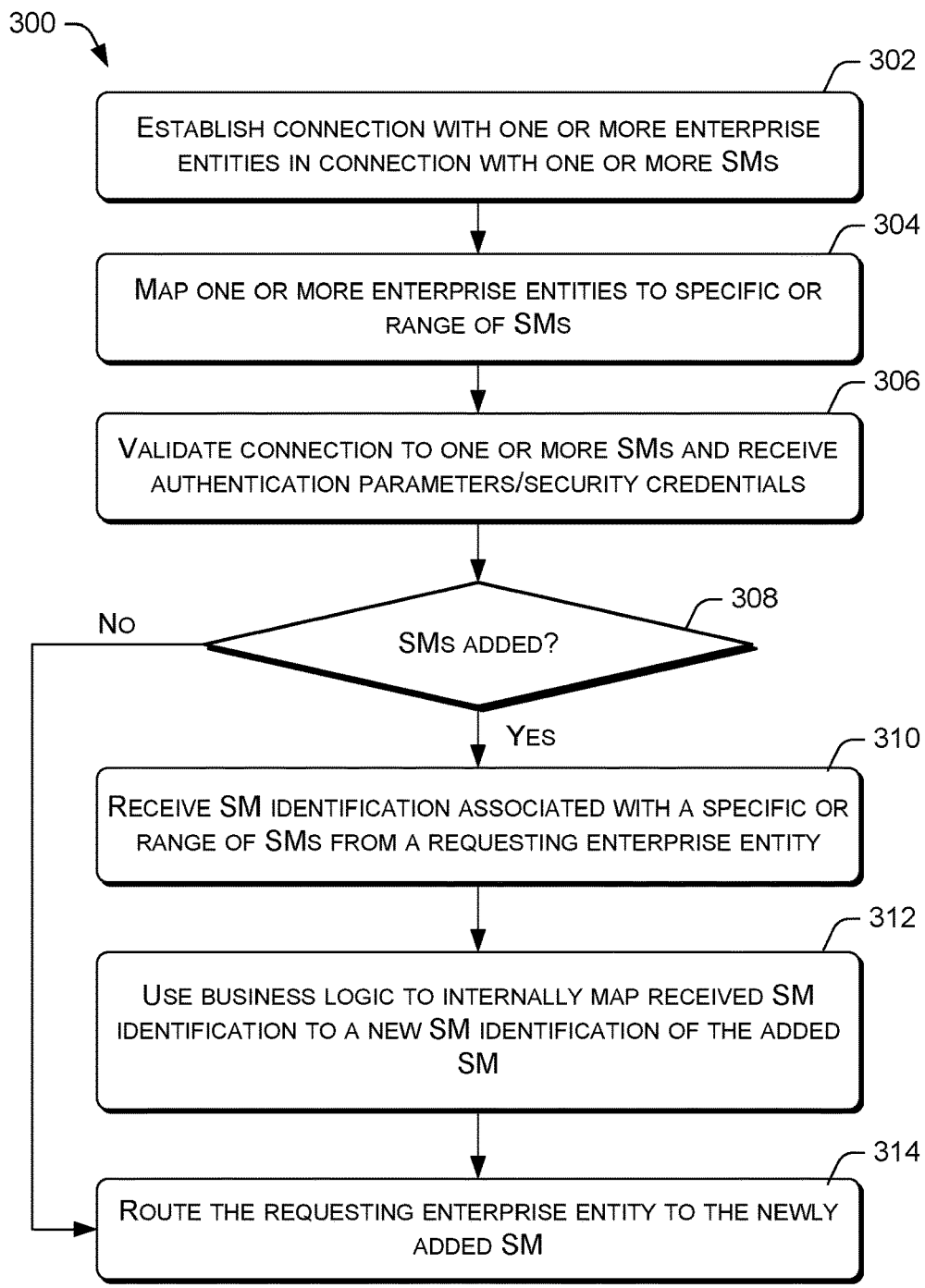
FIG. 3 is a flow diagram of an example process for adding a new subscription manager.

FIG. 3 is a flow diagram of an example process for adding a new subscription manager within a system. At block 302, the on-board manager establishes a connection with one or more enterprise entities and one or more subscription managers. In this regard, the enterprise entities are not directly in communication with the subscription managers. Rather, each of the enterprise entities and the subscription managers is operatively connected to the on-board manager. At block 304, the on-board manager maps one or more enterprise entities to specific or range of subscription managers.

Figure 6:
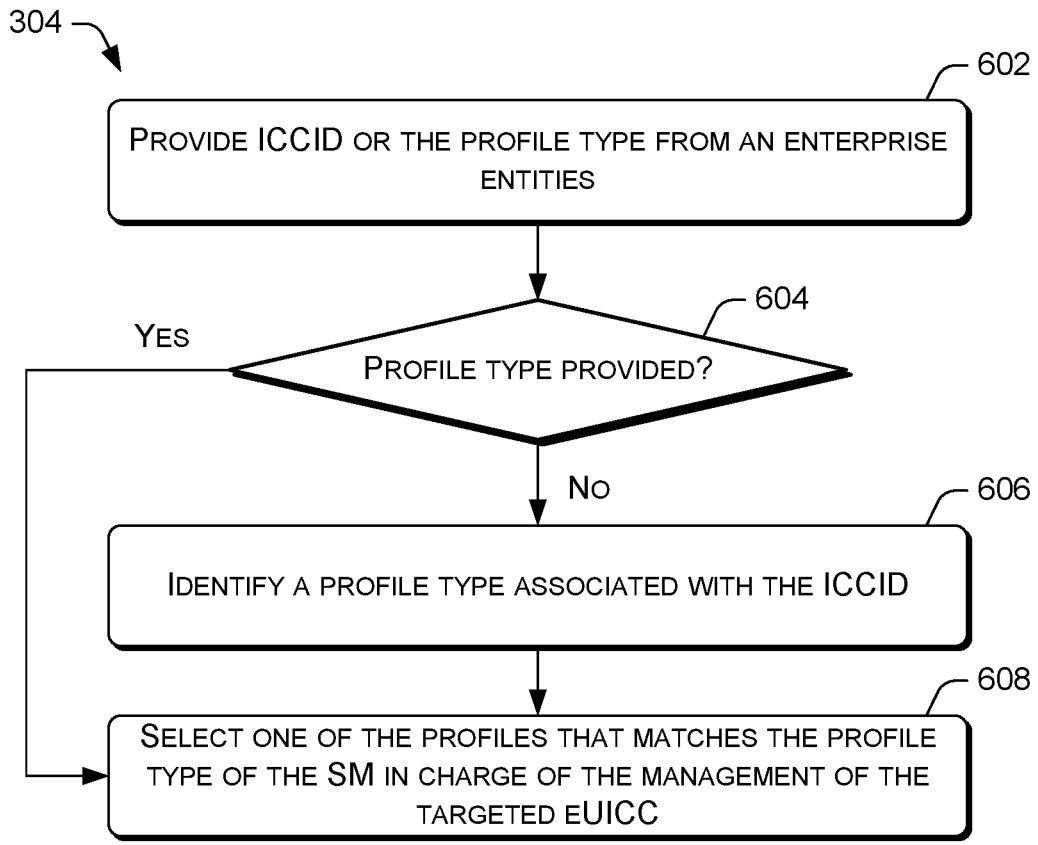
FIG. 6 is a flow diagram of an example process for mapping an enterprise entity and a subscription manager.

FIG. 6 shows a flow diagram of a more detailed process for mapping an enterprise entity and a subscription manager. As indicated in block 602, ICCID or profile type is provided from an enterprise entity to the on-board manager. At decision block 604, the on-board manager determines whether a profile type has been provided. If profile type is provided, the process 304 proceeds to block 608. If a profile type has not been provided, and instead ICCID or another identifier has been provided, the on-board manager identifies a profile type associated with the ICCID 606 or the identifier. If a profile type is provided or once a profile type is identified, the on-board manager selects one of the profiles that matches the profile type of the subscription manager in charge of the management of the targeted eUICC 608.

Returning now to block 306 of FIG. 3, the validation module validates that the correct subscription manager or the correct selection of subscription managers have been mapped to one or more enterprise entities. Additionally, validation module can receive authentication parameters from the subscription manager for remote provisioning and receive security credentials therefrom upon verification of authentication parameters. At decision block 308, the rules engine determines whether one or more subscription managers have been added. If a subscription manager has not been added, the process 300 may proceed to block 314. If a subscription manager has been added, the on-board manager receives subscription manager identifier associated with a specific or range of subscription managers from a requesting enterprise entity 310. At block 312, the rules engine utilizes business logic to internally map received subscription manager identifier to a new subscription manager identifier of the added subscription manager. At block 314, the on-board manager routes the requesting enterprise entity to the newly added subscription manager.

Figure 4:
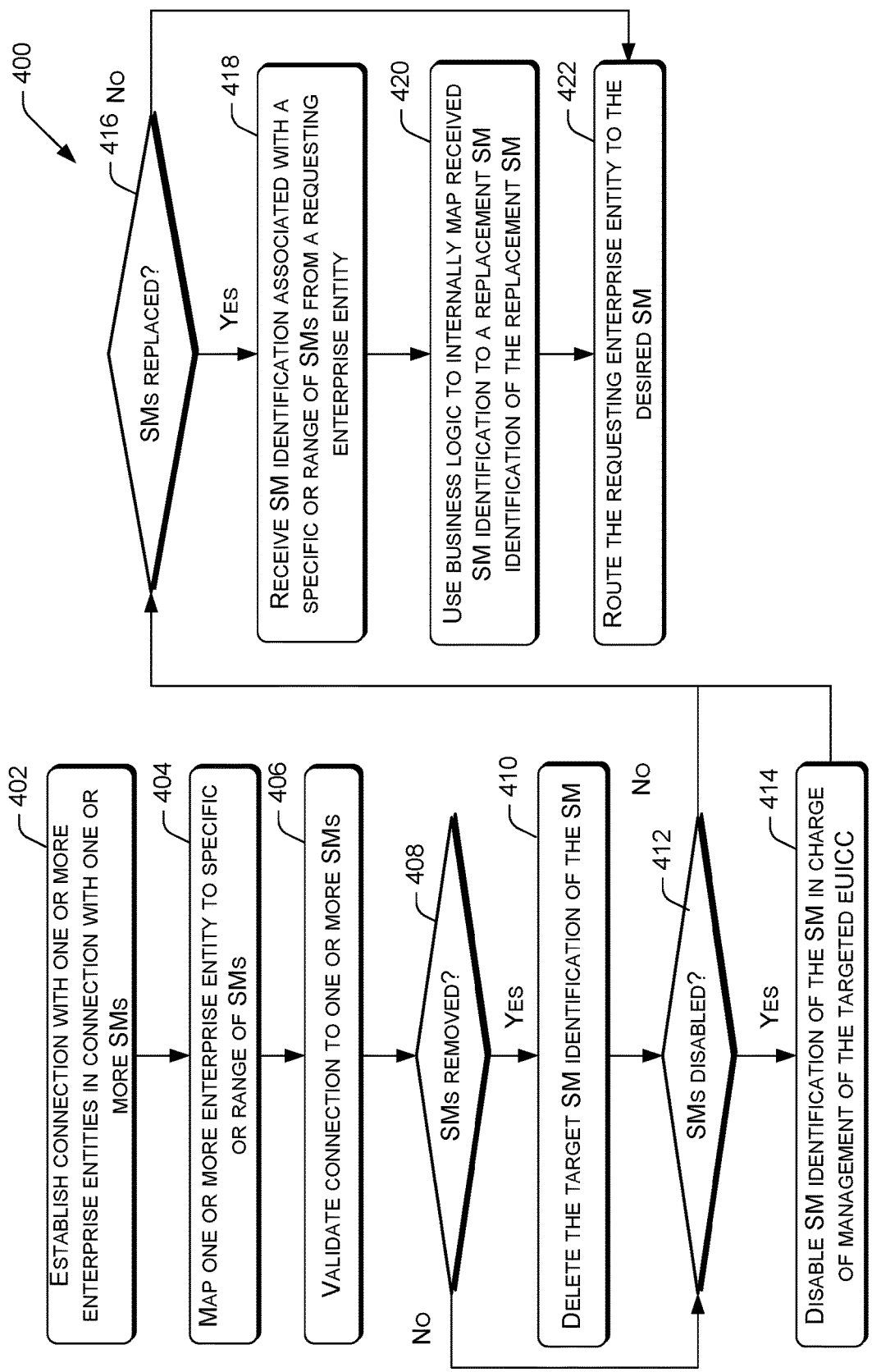
FIG. 4 is a flow diagram of an example process for replacing, removing, or disabling a subscription manager.

FIG. 4 is a flow diagram of an example process for replacing, removing, or disabling a subscription manager within a system. At block 402, the on-board manager establishes a connection with one or more enterprise entities and one or more subscription managers. At block 404, the on-board manager maps one or more enterprise entities to specific or range of subscription managers as described above in reference to FIG. 6. At block 406, the validation module validates that the correct subscription manager or the correct selection of subscription managers have been mapped to one or more enterprise entities. Additionally, validation module can receive authentication parameters from the subscription manager for remote provisioning and receive security credentials therefrom upon verification of authentication parameters. At decision block 408, the rules engine determines whether one or more subscription managers have been removed. If a subscription manager has not been removed, the process 400 may proceed to block 412. If a subscription manager has been removed, the on-board manager requests the requesting enterprise entity to delete the target subscription manager identifier of the subscription manager 410. In this way, the on-board manager is prevented from improperly mapping a requesting enterprise entity to a deleted subscription manager.

At decision block 412, the rules engine determines whether one or more subscription managers have been disabled. If a subscription manager has not been disabled, the process 400 may proceed to block 416. If a subscription manager has been disabled, the on-board manager requests the enterprise entity to disable the subscription manager in charge of the management of the targeted eUICC 414. In this way, the on-board manager is prevented from improperly mapping a requesting enterprise entity to a disabled subscription manager.

At decision block 416, the rules engine determines whether one or more subscription managers have been replaced (i.e., with an existing or newly added subscription manager). If a subscription manager has not been replaced, the process 400 may proceed to block 422. If a subscription manager has been replaced, the on-board manager receives subscription manager identifier associated with a specific or range of subscription managers from a requesting enterprise entity 418. At block 420, the rules engine utilizes business logic to internally map received subscription manager identifier to a replacement subscription manager identifier of the replacement subscription manager. At block 422, the on-board manager routes the requesting enterprise to the desired (i.e., replacement) subscription manager.

Figure 5:
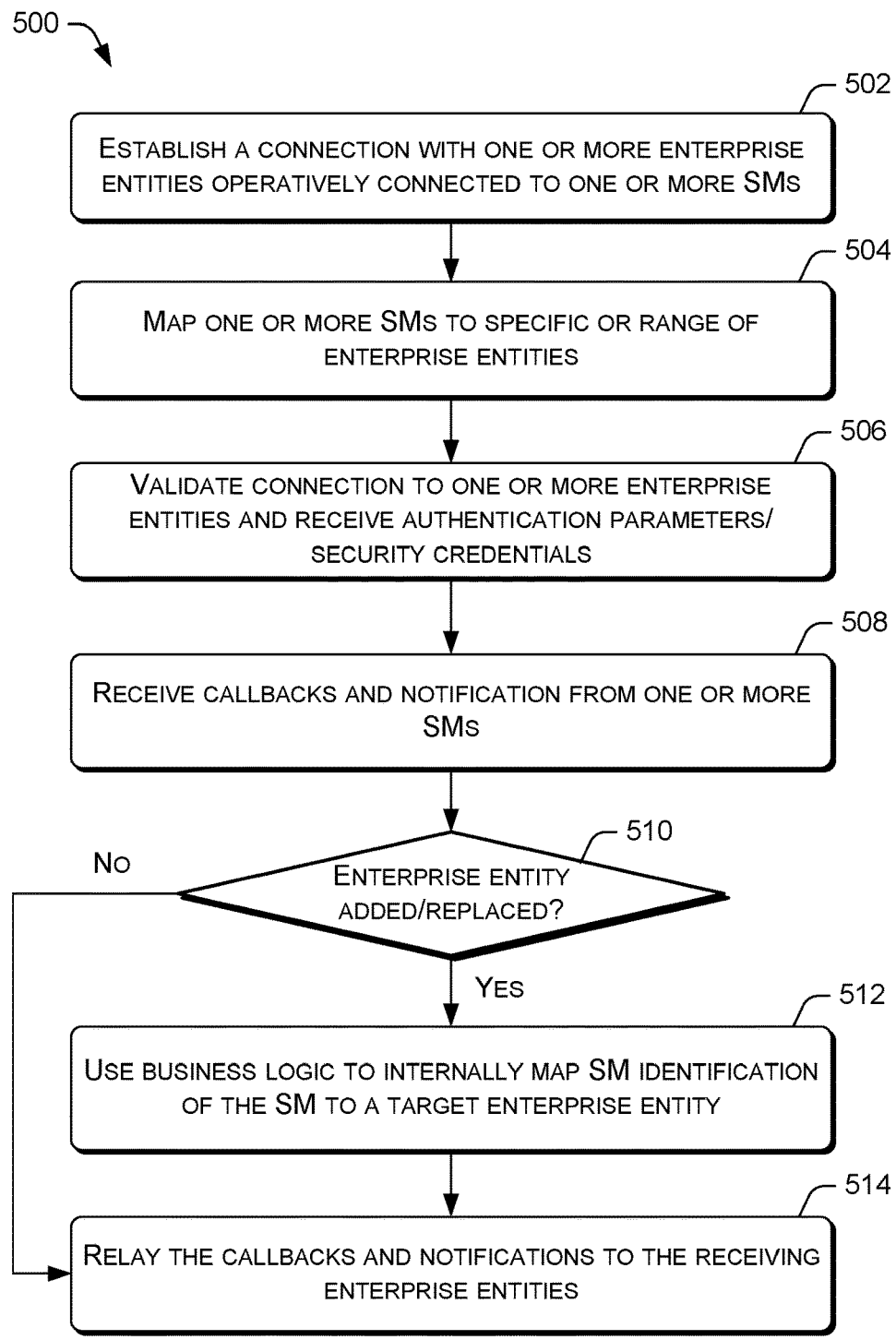
FIG. 5 is a flow diagram of an example process for adding or replacing an enterprise entity.

FIG. 5 is a flow diagram of an example process for adding or replacing an enterprise entity within a system. At block 502, the on-board manager establishes a connection with one or more enterprise entities in communication with one or more subscription managers. At block 504, the on-board manager maps one or more subscription managers to specific or range of enterprise entities. In this regard, similar mapping scheme as described in FIG. 6 can be applied. For example, the on-board manager receives an identifier (e.g., SMSR-ID) associated with a subscription manager and identifies an enterprise entity that manages a matching identifier.

At block 506, the validation module validates connections between one or more subscription managers to one or more enterprise entities. Additionally, validation module can receive authentication parameters from the subscription manager for remote provisioning and receive security credentials therefrom upon verification of authentication parameters. At block 508, one or more subscription managers receives callbacks and notifications. At decision block 510, the rules engine determines whether one or more enterprise entities have been added or replaced. If the enterprise entities have not been added or replaced, the process 500 proceeds to block 514. If one or more enterprise entities have been added or replaced, the rules engine utilizes business logic to internally map subscription manager identifier of the subscription manager to a target enterprise entity 512. At block 514, the on-board manager relays the callbacks and notifications to the receiving enterprise entities.

The techniques described herein for employing the on-board entity to select and route different enterprise entities to subscription managers helps manage interconnectivities among the enterprise entities and subscription managers. Further, through the use of business logic, the on-board manager can adapt to various operating scenarios as described in the embodiments in order to reduce the burden on the enterprise entities and to operate in a more simplistic manner than operating via a direct connection between enterprise entities and subscription managers. As the interconnectivities among enterprise entities and subscription managers become more densified and complex over time, the ability to obtain accurately route different enterprise entities to specific subscription managers may lead to improved remote provisioning and management of the eUICC in machine-to-machine devices which are not easily reachable.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. One or more non-transitory computer-readable media storing computer-executable instructions that upon execution cause one or more processors to perform acts comprising:
   receiving, at an on-board manager residing in a secure data center of a mobile network operator (MNO), a request from one or more enterprise entities, the request comprising a secure routing identifier (SMSR-ID) corresponding to a unique subscription manager, and corresponding to a unique subscription manager secure routing (SM-SR), the request for an embedded universal integrated circuit card (eUICC) identifier (EID);

retrieving, via the on-board manager, the SM-SR corresponding to the received SMSR-ID;

retrieving from a data store, the data store storing a plurality of EIDs, the requested EID, the retrieved EID associated with the unique subscription manager corresponding to the SM-SR;

responsive to the request, serving the retrieved EID to target the unique subscription manager of a plurality of subscription managers in accordance with a mapping scheme;

if the unique subscription manager is removed:
    requesting the one or more enterprise entities to delete the SMSR-ID; and
    serving the retrieved EID to a predetermined subscription manager of the plurality of subscription managers in accordance with predetermined parameters.

2. The one or more non-transitory computer-readable media of claim 1, wherein the request includes credentials in accordance with a public key infrastructure (PKI)-based authentication protocol.

3. The one or more non-transitory computer-readable media of claim 1, wherein the request utilizes a multifactor authentication.

4. The one or more non-transitory computer-readable media of claim 1, wherein the request utilizes an identifier correlating with an account that is associated with a plurality of user equipment in communication with the MNO and a plurality of users.

5. The one or more non-transitory computer-readable media of claim 1, wherein the one or more non-transitory computer-readable media includes a firewall.

6. The one or more non-transitory computer-readable media of claim 1, wherein the request includes one or more Secure Asset Service (SAS) certificates.

7. The one or more non-transitory computer-readable media of claim 1, wherein the acts further comprise:
    selecting, via the on-board manager, one or more routing options of the mapping scheme, wherein the one or more routing options are arranged in a specific order, the one or more routing options selected to load balance distribution of the request among the one or more routing options.

8. One or more non-transitory computer-readable media storing computer-executable instructions that upon execution cause one or more processors to perform acts comprising:
    receiving, at an on-board manager residing in a secure data center of a mobile network operator (MNO), a request from one or more enterprise entities, the request comprising an embedded universal integrated circuit card identifier (EID) and an integrated circuit card identifier (ICCID) corresponding to a unique user equipment, and corresponding to a profile of the MNO that is managed by a unique subscription manager, the request for a secure routing identifier (SMSR-ID);
    retrieving from a data store, the data store storing a plurality of SMSR-IDs, the requested SMSR-ID based at least on the ICCID and a profile type of the profile, the retrieved SMSR-ID and the profile type associated with the unique subscription manager; and
    responsive to the request, serving the retrieved SMSR-ID to target the unique subscription manager of a plurality of subscription managers in accordance with a mapping scheme.

9. The one or more non-transitory computer-readable media of claim 8, wherein the request includes credentials in accordance with a public key infrastructure (PKI)-based authentication protocol.

10. The one or more non-transitory computer-readable media of claim 8, wherein the request utilizes a multifactor authentication.

11. The one or more non-transitory computer-readable media of claim 8, wherein the request utilizes an identifier correlating with an account that is associated with a plurality of user equipment in communication with the MNO and a plurality of users.

12. The one or more non-transitory computer-readable media of claim 8, wherein the one or more non-transitory computer-readable media includes a firewall.

13. The one or more non-transitory computer-readable media of claim 8, wherein the request includes one or more Secure Asset Service (SAS) certificates.

14. The one or more non-transitory computer-readable media of claim 8, wherein the acts further comprise:
    selecting, via the on-board manager, one or more routing options of the mapping scheme, wherein the one or more routing options are arranged in a specific order, the one or more routing options selected to load balance distribution of the request among the one or more routing options.

15. A system, comprising:
    one or more non-transitory storage mediums configured to provide stored code segments, the one or more non-transitory storage mediums coupled to one or more processors, each configured to execute the code segments and causing the one or more processors to:
    receive, at an on-board manager residing in a secure data center of a mobile network operator (MNO), a request from one or more enterprise entities, the request comprising a secure routing identifier (SMSR-ID) corresponding to a unique subscription manager, and corresponding to a unique subscription manager secure routing (SM-SR), the request for an embedded universal integrated circuit card (eUICC) identifier (EID);
    retrieve, via the on-board manager, the SM-SR corresponding to the received SMSR-ID;
    retrieve from a data store, the data store storing a plurality of EIDs, the requested EID, the retrieved EID associated with the unique subscription manager corresponding to the SM-SR;
    responsive to the request, serve the retrieved EID to target the unique subscription manager of a plurality of subscription managers in accordance with a mapping scheme;
    if the unique subscription manager is disabled:
        requesting the one or more enterprise entities to disable the unique subscription manager; and
        serving the retrieved EID to a predetermined subscription manager of the plurality of subscription managers in accordance with predetermined parameters.

16. The system of claim 15, wherein the one or more processor is further configured to:
    receive, at the on-board manager, an integrated circuit card identifier (ICCID) corresponding to a unique user equipment associated with the EID, and corresponding to a profile that is managed by the subscription manager;
    receive, at the on-board manager, the ICCID from the one or more enterprise entities to identify the profile that is associated with the unique subscription manager.

17. The system of claim 15, wherein the one or more processor is further configured to:
- receive, at the on-board manager, a new request from the one or more enterprise entities, the new request comprising a new SMSR-ID corresponding to a new subscription manager, and corresponding to a new subscription manager secure routing (SM-SR);
- retrieve, via the on-board manager, the new SM-SR corresponding to the new SMSR-ID, wherein the retrieved EID is associated with the new subscription manager corresponding to the new SM-SR; and
- update the mapping scheme to target the new subscription manager of the plurality of subscription managers.

18. The system of claim 15, wherein the data store is a home subscriber server (HSS) of a telecommunications network or a home location register (HLR) of the telecommunications network.

19. The system of claim 15, wherein the one or more processor is further configured to integrate with an enterprise resource planning (ERP) system that communicate with the unique subscription manager in accordance with the mapping scheme.

20. The system of claim 15, further comprising a tree being stored on the data store, the tree having a root node for security and configured to implement a protocol to coordinate with a third-party entity.

* * * * *